United States Patent [19]
Friedman

[11] 3,893,592
[45] July 8, 1975

[54] MEASURING AND DISPENSING APPARATUS

[76] Inventor: Louis T. Friedman, 2 Leonard St., Farmingdale, N.Y. 11735

[22] Filed: Oct. 29, 1973

[21] Appl. No.: 410,420

[52] U.S. Cl. .............. 222/14; 119/51.13; 185/39; 222/452
[51] Int. Cl. .................. B67d 5/30; G01f 11/26
[58] Field of Search ........... 185/39, 44; 222/14, 41, 222/42, 370, 448, 452, 504; 119/51.13, 51.15, 56 R

[56] References Cited
UNITED STATES PATENTS

| 829,018 | 8/1906 | Kiefer | 222/42 |
| 1,230,195 | 6/1917 | Mauch | 185/39 |
| 2,750,072 | 6/1956 | Duncan | 222/370 X |
| 3,260,415 | 7/1966 | Minamiyama et al. | 222/452 X |

Primary Examiner—Robert B. Reeves
Assistant Examiner—Larry H. Martin
Attorney, Agent, or Firm—Roberts & Cohen

[57] ABSTRACT

A measuring and dispensing device includes a cylinder divided by radial vanes into a plurality of passages. At the top of the cylinder is arranged a disc segment which is capable of closing off a plurality of the aforesaid passages. A disc segment is also arranged at the bottom of the cylinder to close off a greater number of the passages. The upper disc segment is staggered relative to the lower disc segment with which it overlaps so that no clear and direct passage is afforded through any of the passages in the cylinder. A bin of material such as rice, flour, metal parts or the like is superposed over the cylinder. The aforesaid disc segments are driven by a manually operated spring loaded belt such that the belt can be displaced for the discharge of a selectable number of passages. Upon displacement of the belt, a spring is loaded to return the belt for driving the disc segments. The disc segments are driven by the belt through the intermediary of a ratchet arrangement or the like so that the discs are driven in one direction only.

15 Claims, 9 Drawing Figures

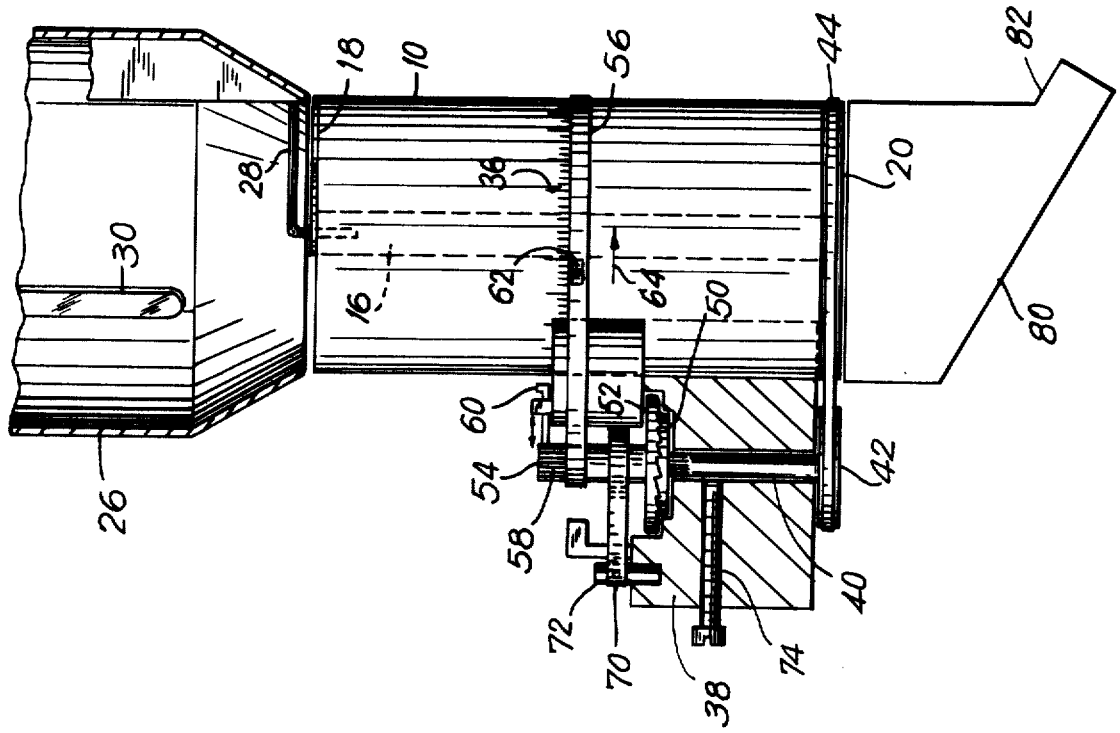
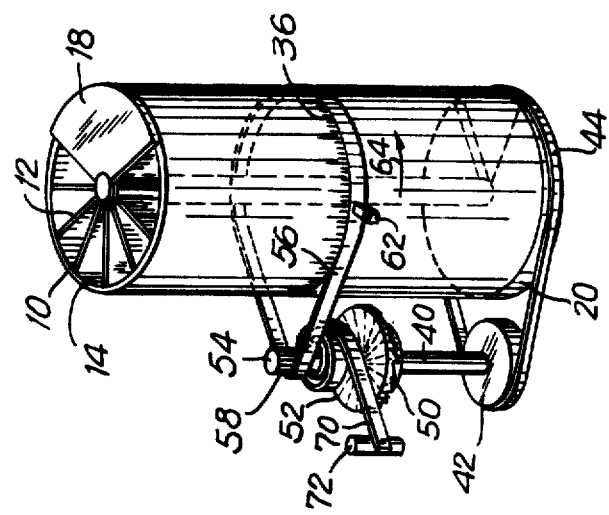

MEASURING AND DISPENSING APPARATUS

FIELD OF INVENTION

This invention relates to measuring and dispensing devices and more particularly to apparatus capable of dispensing measured amounts of flowable material such as materials in the form of powders, granules, pellets and the like which may be crystalline or amorphous and which include organic and inorganic materials.

BACKGROUND

Apparatus is known by means of which free-flowing solids may be dispensed where such materials are in the form of powders, granules, pellets and the like. As illustrative but non-limitative examples such devices can handle sugar, flour, corn starch, salt, coffee, powdered metals, small ballbearings, powdered and granular solid fuels and grains such as rice, wheat and barley as well as chemicals, pharmaceuticals and so forth.

One such known device is shown in U.S. Pat. No. 829,018 which issued Aug. 21, 1906 to F. Kiefer. Therein is illustrated a plurality of vertically disposed passages having upper and lower covers which are disc segments which rotate together but which, as will be seen hereinafter, are differently related to one another and thus function in a different manner from the arrangements contemplated within the scope of the present invention. In addition, the disc segments of the Kiefer Patent are manipulated by a handle 19 which is distinguishable from the drive arrangement of the invention which will be described in detail hereinafter.

A measuring vessel is furthermore shown in the W. H. Cloud U.S. Pat. No. 614,646 which issued Nov. 22, 1898. Herein disc segments are provided which are separately movable and which are manipulatable dependently of one another such that the arrangement operates in a manner distinguishable from that which will be be described hereinbelow.

Of more recent vintage, the G. E. Weir U.S. Pat. No. 2,877,937, which issued Mar. 17, 1959, utilizes upper and lower shutters disposed above and below a cylinder and cooperative therewith to admit materials through the upper part of the cylinder and to discharge the same from the lower part of the cylinder. This patented structure is distinguishable from the structure which is to be described in detail hereinbelow in the arrangement of the upper and lower shutters and in the technique employed for driving the same.

In the K. Minamiyama U.S. Pat. No. 3,260,415, which issued July Minamiyama 12, 1966, there is also described a particulate solid material discharge apparatus which employs upper and lower shutters in connection with a cylindrical member divided into a plurality of parallel passages. The upper and lower shutters are, however, distinguishable from those of the instant Application and, thus, the apparatus of Minamiyama functions differently from that to be described below.

In addition to the aforesaid, there is described in the W. K. Kleysteuber U.S. Pat. No. 3,554,406, a rotary apparatus for feeding granular material into an evacuated receiver. Not only is the measuring and distribution portion of this apparatus distinguishable from that of the instant invention but furthermore the drive employed includes an electric motor which makes the arrangement substantially more complicated and expensive than that which is contemplated in accordance with the instant invention.

Other patents which disclose measuring and dispensing devices or portions thereof include the R. V. Graham U.S. Pat. No. 1,684,313, the E. Riendeau U.S. Pat. No. 2,250,968, the L. N. Duncan U.S. Pat. No. 2,750,072, the W. J. Dobkin U.S. Pat. No. 2,878,970 and the H. F. Techtmann U.S. Pat. No. 3,477,617. These patents are all distinguishable from the subject matter of the instant invention as will be apparent from the detailed description which follows hereinafter.

SUMMARY OF THE INVENTION

It is an object of the invention to provide an improved measuring and dispensing apparatus.

Is is a further object of the invention to provide an improved measuring and dispensing apparatus characterized by a simplicity of drive which results in ease of maintenance and relatively low initial cost.

Yet another object of the invention is to provide an improved measuring and dispensing device enabling improved feed into measuring chambers or passages and improved discharge therefrom.

Yet another object of the invention is to provide an improved measuring and dispensing device which is easily manufactured and which may be readily maintained in hygienic conditions.

To achieve the above and other objects of the invention, there is provided an apparatus comprising a source of flowable material and, in association therewith, a passage means having a sequence of parallel passages adapted for being fed by the aforesaid source. These passages are provided with inlets and outlets and first and second blocking means are displaceable to obturate selected of the inlets whereby to prevent feeding of the associated passages from the source while the remainder of the inlets are open so that the corresponding passages can be fed from the aforesaid source. The second blocking means obturates selected of the outlets constituting less than all of the same but including at least those outlets associated with passages whose inlets are not obturated by the first said blocking means.

In association with the aforesaid apparatus, there is provided a driving means for the concomitant driving of the first and second blocking means to displace the same relative to the sequence of passages whereby material can flow into selected passages and out of selected passages but is prevented from flowing from the source directly through any of the passages. This drive means includes control means displaceable through distances corresponding to selectable numbers of the aforesaid passages, storage means to store energy corresponding to the displacement of the control means and coupling means effective on release of the control means and responsive to the storage means to drive the first and second blocking means across the inlets and outlets to release material from the selected number of passages and to permit the recharging of the passages from the source.

As a feature of the invention, the passage means is disposed to be fed gravitationally from the source. Moreover, the passage means includes a cylinder having a generally vertical axis and a plurality of radially disposed separators or vanes in the cylinder dividing the same into the parallel passages which are of generally equal angular extent.

The first blocking means may be a disc segment located between the source and cylinder and adapted for simultaneously covering a plurality but less than half of the inlets. The second blocking means may be a disc segment coaxial with the first segment and adaptable for covering the outlets of at least those passages whose inlets are not covered by the first said disc segment. Preferably, the first and second blocking means are connected for simultaneous movement and are both disc segments which are so designed to respectively cover an extent of less than and more than 180° respectively. Furthermore, the angular extent of the segments preferably total over 360°. Still further, the first blocking means will preferably have an angular extent of about 40 percent of the second blocking means.

As a further feature of the invention, the aforesaid drive means may include a rate control means which controls the rate at which the blocking means are driven. As a further feature of the invention, the device may include locking means to hold the blocking means in fixed position.

According to still a further feature of the invention, the disc segments may overlap by an amount equivalent to at least two passages. Still further, the second said disc segment may define a generally wedge shaped opening which is centered relative to the first said disc segment.

In accordance with a further feature of the invention, there may be provided scale means cooperatively related to the aforesaid control means whereby displacement of the control means can be related to selectable amounts of the material to be measured and dispensed. The control means may further include a drive belt, means for manually displacing said belt, a shaft driven by this belt and a spring loading the shaft to constitute the storage means and to return the shaft to a normal position of rest. A stop may be provided for defining the position of rest for the shaft, the spring loading the shaft against the said stop.

The means for manually displacing the belt as aforesaid may include a grip fixedly arranged on the aforesaid belt, said grip being displaceable to a selected position relative to the aforesaid scale means.

The coupling means mentioned hereinabove may include first and second coaxial drive discs, the first drive disc driving the aforesaid shaft, there being furthermore provided unidirectional drive means coupling the drive discs so that the second drive disc is driven only in one direction of rotation by the aforesaid shaft.

The above and other objects, features and advantages of the invention will be found in the detailed description which follows hereinafter and which is illustrated in the accompanying drawing.

BRIEF DESCRIPTION OF DRAWING

In the drawing:

FIGS. 2(a)-2(f) diagrammatically illustrate the operation of the aforesaid blocking means;

FIG. 3 is a diagrammatic perspective view of the drive means by which the aforesaid blocking means are driven; and FIG. 4 is a fragmentary and diagrammatic as well as partially sectional view of the apparatus of the invention.

DETAILED DESCRIPTION

As has been generalized above, the apparatus of the invention comprises a source of flowable material with a passage means having a sequence of parallel passages adapted for being fed by the source. The passages have inlets and outlets and respective blocking means are displaceable to obturate selected of the inlets and selected of the outlets to provide for a measuring and dispensing operation.

Figure 1:
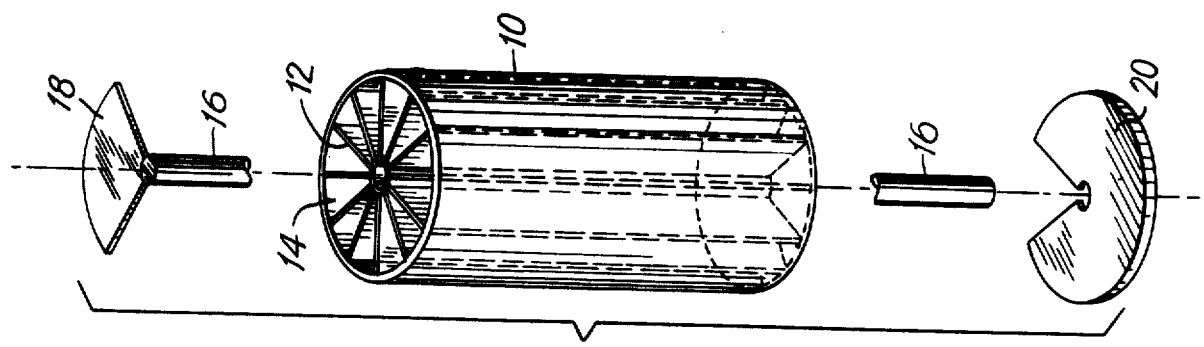
FIG. 1 is a diagrammatic exploded view showing the measuring and dispensing portion of the apparatus of the invention including the aforesaid sectioned cylinder and blocking means.

In FIG. 1 appears a cylinder 10. This cylinder is divided by a plurality of radially disposed vanes 12 into a plurality of parallel passages 14. These passages are generally wedged shaped and, as there are twelve such passages, they each subtend an angular extent of about 30°.

Extending longitudinally through the cylinder 10 is shaft 16. This shaft is fixedly connected to an upper blocking device or disc segment 18 and to a lower blocking device or disc segment 20. The blocking device 18 is driven concomitantly with the blocking device 20 so that their related size and shape is of importance in determining the charging and discharging of the various passages 14 in the cylinder 10.

The dimensions of the passages are subject to variation as determined by a variety of considerations. These considerations include the nature of the material to be dispensed, the quantity of material to be dispensed, the rate at which the material is preferably to be dispensed, the units of measure in which the material is to be dispensed and so forth.

For example, a twelve passage cylinder such as has been illustrated might be useful in dispensing in units designated as cups. Thus, given a certain value of open area of each passage, it is possible to establish a height of the cylinder so that the total volume held in the twelve segments might constitute one measuring cup. Thus, if each 30° rotation of the blocking devices delivers one-twelfth of a cup, then a three unit rotation will deliver a quarter of a cup and 4-unit rotation will deliver a third of a cup. Along the same lines, a six unit rotation will deliver half of a cup and so forth. By changing the number of segments or by using the same number of segments and changing their effective cross-sectional area as well as by selecting a suitable cylinder height, other fractions and/or multiples of units can be dispensed such as, for example, liters, tablespoons and so forth.

Despite the selection of passage size and cylinder height and the like, both ends of the cylinder must remain open and the effective cross-sectional areas of the passages must be equal and without crevices, undercuts and so forth so that the free flowing material which is to be dispensed is free to flow therethrough without impediment.

Figure 2A:
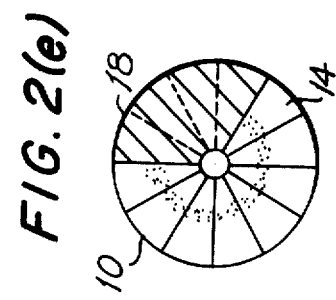
Figure 2E:
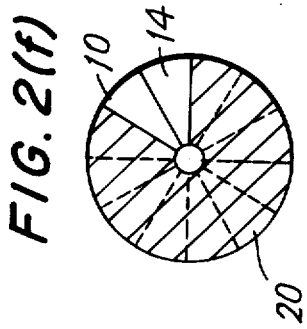
Figure 2C:
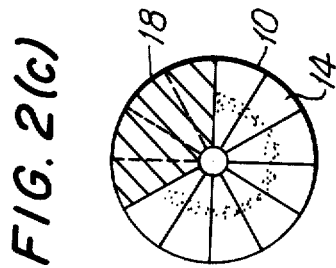

FIGS. 2(a), 2(c) and 2(e) illustrate three respective positions of the top blocking device 18 in association with the passages 14 of the cylinder 10.

Figure 2F:
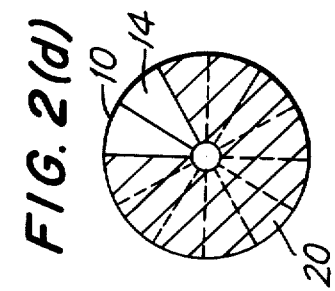
Figure 2A:
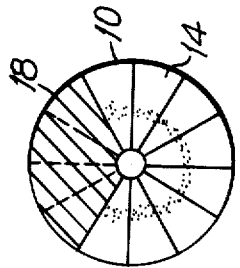
Figure 2B:
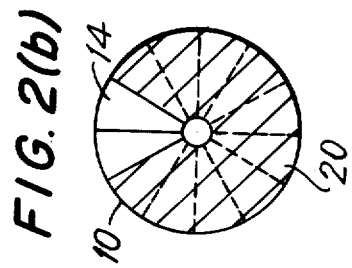

FIG. 2(b) shows the position of the bottom blocking device 20 as fixed relative to the blocking device 18 illustrated in 2(a). Similarly, FIG. 2(d) shows the blocking device in its position as fixed relative to the device 18 as illustrated in FIG. 2(c) and FIG. 2(f) shows the device 20 in the position which it assumes according to the displacement of blocking device 18 as illustrated in FIG. 2(e).

In FIG. 2(a), the blocking device 18 obturates the inlets to four of the passages 14. The remainder of the passages 14 have their respective inlets open so that a superposed bin of flowable material can discharge its contents into these open passages.

At the same time, the blocking device 20 in FIG. 2(b) obturates all except two of the passages 14 or the outlets thereof so that no material can flow from the superposed bin directly through any of the passages 14 to be discharged from the latter.

In FIG. 2(c) the blocking device 18 has been displaced clockwise by the extent of one passage. The blocking device 20 in FIG. 2(d) has similarly been rotated clockwise by the extent of one passage. The similar movement of the two blocking devices is due to the connection which is provided therebetween.

In moving from the position illustrated in FIG. 2(a) to the position illustrated in FIG. 2(c), the blocking device 18 closes off the inlet of the next sequential passage while opening up one additional passage. This permits charging of material into the additional newly opened passage.

At the same time the movement of the blocking device 20 as illustrated in FIG. 2(d) fails to open the outlet of any passage which has been previously charged so that, while the device is now primed to operate, no material has yet been discharged.

The movement of blocking device 18 as illustrated in FIG. 2(e) permits the opening of still one additional passage and this passage is additionally charged with material. The movement of the blocking device 20 as illustrated in FIG. 2(f) for the first time opens one of the passages 14 which has previously been charged with material. This permits the discharge of material via the outlet of the thusly opened passage. Each subsequent unitary displacement of blocking device 18 and blocking device 20 will permit the charging of an additional passage and the discharging of one passage. Thereby provision is made for charging the cylinder 10 and discharging various passages thereof without there being any path of direct flow of material from a superposed bin through any of the passages.

FIGS. 3 and 4 diagrammatically illustrate the drive which is provided for moving the blocking devices described hereinabove and in FIGS. 3 and 4 appear the cylinder 10 and blocking devices 18 and 20.

Additionally illustrated is a superposed bin 26 (FIG. 4) relative to which the cylinder 10 is positioned in order to be gravitationally fed with materials stored in the bin 26.

Also appearing in FIGS. 3 and 4 is the shaft 16 connected to both the disc segment 18 and the disc segment 20. A scraper 28 is connected to and rotatable with the shaft 16 in order to dislodge material which may accumulate on the sides of the bin 26. This bin may moreover be provided with a window 30 through which the amount of material residing in the bin may be readily observed.

Located on the outside of the cylinder 10 is a scale 36. This scale may be calibrated in whatever units are desired such as, for example, cups, tablespoons, liters and so forth. The purpose of this scale will become apparent hereinafter.

Attached to the outside of the cylinder 10 is a bracket 38. This bracket supports a shaft 40 at the low end of which is located an actuating disc 42. The actuating disc is coupled by means of a belt 44 to the disc segment 20. This coupling may be directly effected or may pass through the intermediary of a wheel connected to the disc. The belt may engage the blocking device 20 frictionally or by means of teeth or other such projections provided on the blocking device 20. In any event, rotation of the actuating disc 42 is intended to drive the belt 40 which in turn drives the blocking device 20. Inasmuch as the blocking device is connected through the shaft 16 to the blocking device 18, the blocking devices 18 and 20 are driven concomitantly.

A disc 50 is provided which has a splined connection with the shaft 40. This splined connection causes the disc 50 to rotate with the shaft 40 while permitting an axial displacement of the disc 50 of said shaft.

A disc 52 is superposed above the disc 50 and there is a ratchet-type face-to-face engagement between the discs 50 and 52 which permit the same to constitute a unidirectional drive. The utility of this unidirectional drive will be made apparent hereinafter.

It is to be noted that the disc 50 is yieldingly urged against the disc 52 by means of a spring (not shown). This spring may be interposed between the bracket 38 and the disc 50.

A further shaft 54 is rigidly connected to the disc 52. This shaft 54 is driven by a belt 56. The top of shaft 54 may be serrated as indicated at 58. The purpose of these serrations is to permit the locking of the shaft 54 in loaded condition. The locking of the shaft 54 in loaded condition is diagrammatically indicated by the provision of a slidable latch 60 mounted on the bracket 38.

Displacement of the belt 56 and therefore rotation of the shaft 54 is effected through a manually engageable member 62 which is mounted on the belt 56. This manually engageable member 62 may be displaced in the direction indicated generally by the arrow 64 to a selectable position relative to the scale 36. Since the scale 36 will be calibrated in terms of the units which are to be dispensed, displacement of the member 62 with respect to a selected position on the scale 36 will subsequently result in the discharge of an amount of material corresponding to a selected number of passages.

The shaft 54 is spring loaded by a spring 70 which is connected to the shaft 54 and which is loaded relative to a position established by a pin 72 mounted on the bracket 38. At the same time, it will be noted that a threadably adjustable member 74 passes through the bracket 38 and radially engages against the shaft 40 to establish a degree of friction which determines the speed at which the shaft 40 can be rotated. Screw-like adjustment of the member 74 controls the pressure which the latter exerts against shaft 40 and therefore controls the rate of slippage of shaft 40 past the inner extremity of member 74.

A chute 80 is provided below the cylinder 10 and collects the material which is emptied from respective of the passages 14 and disposes of the same outwardly through a discharge opening 82.

Relative to the above described apparatus, material placed into the bin 26 will be discharged into selected of the passages 14 in the cylinder 20 as permitted by the blocking device or disc segment 18. Material will be discharged from the thusly charged passages by movement of the blocking device of disc segment 20. Material thusly discharged from the outlets of the selected passages 14 will pass into the chute 80 and be discharged via the outlet 82.

At the beginning of an operation, the shaft 54 will be loaded by the spring 70 against a stop (not shown). The belt 56 will be displaced in a direction indicated by arrows 64 by manipulation of the member 62 rigidly fixed to the belt 56. The member 64 will be displaced to a position with respect to the scale 36 which has been previously calibrated relative to the passages 14. At this point, the belt 56 may be held in position by operation of the locking member 62 against the serrated portion 58 at the top of the shaft 54 or may be directly released. In either event, the movement of the belt 56 will rotate the shaft 54 in a direction to load the spring or storage device 70 to a selected extent whereby, upon release of the shaft, the shaft will be rotated by the spring 70 to rotate the disc 52.

In view of the unidirectional coupling as between the discs 50 and 52, movement of the belt 56 in the direction of arrow 64 and the accompanying rotation of the shaft 54 will not rotate the disc 50 while the spring 70 is being loaded. Upon release of the belt 56, the spring 70 will rotate shaft 54 which will drive disc 52 in a direction to drive the disc 50. Shaft 40 will be thusly rotated along with disc 42 which will drive the belt 44 and thereby the blocking devices 18 and 20.

The blocking devices 18 and 20 will move in the manner indicated in FIGS. 2(a) – 2(f) and thereby the passages 14 will be loaded and discharged.

It is to be appreciated that the invention has been only diagrammatically illustrated. Thus, for example, elements 58 and 60 are intended only to indicate that the shaft 54 can be locked in position such that movement of the belt 56 need not result in an immediate operation of blocking devices 18 and 20. At the same time, the device 74 is employed merely to illustrate diagrammatically that the rate of movement of the blocking devices 18 and 20 is controllable as desired. Obviously, a variety of substitute devices can be employed with respect to the lock constituted by elements 58 and 60 and the rate control indicated by the device 74. Similarly, the unidirectional drive provided between the disc 50 and 52 can also be replaced by other devices intended to perform the same function.

From what has been described above, it will now be appreciated that the invention contemplates a source of flowable material operating in association with passage means having a sequence of parallel passages adapted for being fed from the source. The passages have associated therewith blocking means displaceable to obturate selected of the inlets to the passages and selected of the outlets therefrom. The device also includes a drive means for the concomitant driving of the blocking means to displace the same relative to the sequence of passages whereby material can flow into selected passages and out of selected passages but is prevented from flowing from the source directly through any of the passages.

The aforedescribed drive means includes control means displaceable through distances corresponding to selectable numbers of passages and storage means to store energy corresponding to the displacement of the control means. Furthermore, the drive means includes a coupling means effective on release of the control means and responsive to the storage means to drive the first and second blocking means to release material from the selected number of passages and to permit the recharging of the passages from the aforesaid source.

It has also been seen in the above that the cylinder 10 includes a generally vertical axis and is a fixed member within which a plurality of radially disposed separators which divide the same into the aforementioned plurality of parallel passages. These passages are preferably of generally equal angular extent.

The blocking means 18, as has been noted, is a disc segment located between the bin and the cylinder. It is adapted for simultaneously covering a plurality of passages but preferably less than half of the inlets to the same.

The blocking device 20 is a disc segment coaxial with the disc segment 18 and adapted for covering the outlets of at least those passages whose inlets are not covered by the disc segment 18.

The two disc segments, as has been noted hereinabove, are connected together for joint movement, preferably in parallel planes. These disc segments may advantageously overlap by an amount equivalent to two passages. Moreover, the disc segment 20 defines a generally wedge shaped opening which is centered relative to the disc segment 18.

In the aforedescribed apparatus, there has been shown a scale means cooperatively related with a control means whereby displacement of the control means can be related to selectable amounts of the material to be dispensed and preferably to integral numbers of passages.

Relative to the blocking devices, the blocking devices 18 preferably covers an extent of less than 180° whereas the blocking device 20 preferably covers an extent in excess of 180°. The total angular extents of these two segments, however, is greater than 360°. Preferably, the first blocking device has an angular extent of about 40 percent that of the disc segment 20.

As has also been noted, the drive means may also include a rate control and there may be provided a locking device to hold the blocking devices in fixed position.

There will now be obvious to those skilled in the art many modifications and variations of the structures set forth hereinabove. These modifications and variations will not depart from the scope of the invention if defined by the following claims.

What is claimed is:

1. Apparatus comprising a source of flowable material, passage means having a sequence of parallel passages adapted for being fed by said source, said passages having inlets and outlets, first blocking means displaceable to obturate selected of said inlets whereby to prevent feeding of the associated passages from said source while the remainder of said inlets are open so that the corresponding passages can be fed from said source, second blocking means to obturate selected of said outlets constituting less than all of the same but including at least those of said outlets associated with the passages whose inlets are not obturated by said first blocking means, and drive means for the concomitant driving of said first and second blocking means to displace the same relative to said sequence of passages whereby said material can flow into selected passages and out of selected passages but is prevented from flowing from said source directly through any of the passages; said drive means including control means displaceable through distances corresponding to selectable numbers of said passages, storage means to store energy corresponding to the displacement of said control means, coupling means effective on release of said control means and responsive to said storage means to drive the first and second blocking means across said inlets and outlets to release material from the selected number of passages and to permit the recharging of the passages from said source, and scale means cooperatively related to said control means whereby displacement of said control means can be related to selectable amounts of said material, said control means including a drive mechanism, means for manually displacing said drive mechanism, a shaft driven by said drive mechanism, and a spring loading said shaft to return the same to a normal position of rest.

2. Apparatus as claimed in claim 1 wherein said passage means is disposed to be fed gravitationally from said source.

3. Apparatus as claimed in claim 2 wherein said passage means includes a cylinder having a generally vertical axis and a plurality of radially disposed separators in said cylinder dividing the same into said passages which are of generally equal angular extent.

4. Apparatus as claimed in claim 3, wherein said source is a bin superposed over said cylinder and scraper means in said bin to dislodge the material therein, said scraper means being connected to and driven by said shaft.

5. Apparatus as claimed in claim 1 wherein the said blocking means are disc segments overlaping by an amount equivalent to at least two passages.

6. Apparatus as claimed in claim 5 wherein one of said said disc segments defines a generally wedge shaped opening which is centered relative to the other said disc segment.

7. Apparatus as claimed in claim 1 comprising a stop for defining the position of rest for the shaft, said spring loading the shaft against said stop.

8. Apparatus as claimed in claim 1 wherein the means for manually displacing the belt includes a grip fixedly on said drive mechanism, said being displaceable to a selectable position relative to said scale means.

9. Apparatus as claimed in claim 1 wherein said coupling means includes first and second coaxial drive discs, said first drive disc driving by said shaft, unidirectional drive means coupling said drive discs so that said second drive disc is driven only in one direction of rotation of said shaft, and further means coupling said second drive disc to at least one of said blocking means.

10. Apparatus as claimed in claim 9 wherein said further means includes a belt for driving both said blocking means.

11. Apparatus as claimed in claim 1 wherein said first and second blocking means are connected for simultaneous movement and are both disc segments which respectively cover an extent of less than and more than 180°.

12. Apparatus as claimed in claim 11 wherein the angular extents of the segments total over 360°.

13. Apparatus as claimed in claim 12 wherein the first blocking means has an angular extent of about forty percent that of the second blocking means.

14. Apparatus as claimed in claim 1 wherein said drive mechanism includes a rate control means to control the rate at which said blocking means are driven.

15. Apparatus as claimed in claim 1 comprising locking means to hold the blocking means in fixed position.

* * * * *